(12) United States Patent
Karei

(10) Patent No.: US 10,392,789 B2
(45) Date of Patent: Aug. 27, 2019

(54) WATER DISCHARGE APPARATUS AND PHOTOELECTRIC SENSOR

(71) Applicant: TOTO LTD., Kitakyushu-shi, Fukuoka (JP)

(72) Inventor: Minoru Karei, Kitakyushu (JP)

(73) Assignee: TOTO LTD., Kitakyushu-Shi, Fukuoka (JP)

(*) Notice: Subject to any disclaimer, the term of this patent is extended or adjusted under 35 U.S.C. 154(b) by 28 days.

(21) Appl. No.: 15/486,444

(22) Filed: Apr. 13, 2017

(65) Prior Publication Data

US 2017/0328048 A1 Nov. 16, 2017

(30) Foreign Application Priority Data

May 13, 2016 (JP) ................................. 2016-097266

(51) Int. Cl.
| *E03C 1/05* | (2006.01) |
| *E03D 5/10* | (2006.01) |
| *G01J 1/02* | (2006.01) |
| *G01J 1/04* | (2006.01) |
| *G01V 8/12* | (2006.01) |

(52) U.S. Cl.
CPC .............. *E03D 5/105* (2013.01); *E03C 1/057* (2013.01); *G01J 1/0271* (2013.01); *G01J 1/0429* (2013.01); *G01V 8/12* (2013.01); *G01J 2001/0276* (2013.01)

(58) Field of Classification Search
CPC ..................................................... E03D 5/105
USPC .............................................................. 4/304
See application file for complete search history.

(56) References Cited

U.S. PATENT DOCUMENTS

| 4,984,314 A | * | 1/1991 | Weigert | ................... E03C 1/057 4/304 |
| 2005/0000015 A1 | | 1/2005 | Kaneko | |
| 2010/0102410 A1 | | 4/2010 | Shimizu | |
| 2010/0258711 A1 | | 10/2010 | Wang | |
| 2015/0259890 A1 | * | 9/2015 | Shirai | ...................... E03C 1/057 4/668 |
| 2017/0198460 A1 | * | 7/2017 | Kamata | ................... E03C 1/057 |
| 2018/0106024 A1 | * | 4/2018 | Kawana | ................... E03C 1/055 |

* cited by examiner

*Primary Examiner* — Lori L Baker
(74) *Attorney, Agent, or Firm* — Pearne & Gordon LLP

(57) ABSTRACT

A water discharge apparatus including a water discharger, a water supply path, an opening/closing valve, a photoelectric sensor, and a controller, the photoelectric sensor projects detection light, receives a reflected light of the detection light, and outputs a received signal corresponding to a light reception amount of the reflected light, the controller detects an existence or absence of an object based on the received signal and controls opening and closing of the opening/closing valve according to a detection result of the object, the photoelectric sensor includes a sensor main body and a conductive member, the sensor main body includes a light-projecting element and a light receiving element, and the conductive member covers a front of the light receiving element, is formed in a sheet configuration, is light-transmissive, is conductive, and is electrically connected to a reference potential of the sensor main body.

15 Claims, 10 Drawing Sheets

WATER DISCHARGE APPARATUS AND PHOTOELECTRIC SENSOR

CROSS-REFERENCE TO RELATED APPLICATIONS

This application is based upon and claims the benefit of priority from Japanese Patent Application No. 2016-097266, filed on May 13, 2016; the entire contents of which are incorporated herein by reference.

FIELD

Embodiments described herein relate generally to a water discharge apparatus and a photoelectric sensor.

BACKGROUND

There is a water discharge apparatus that automatically controls the water discharge and shutoff by using a photoelectric sensor to detect an object such as a hand of a user, etc., and by operating an opening/closing valve. For example, such a water discharge apparatus is applied in a faucet apparatus, a urinal, a commode, etc.

The photoelectric sensor includes a light-projecting element projecting detection light such as infrared light, etc., includes a light receiving element receiving reflected light of the detection light reflected by the object, and outputs a received signal corresponding to a light reception amount of the light receiving element. For example, the water discharge apparatus starts the water discharge when the received signal exceeds a prescribed threshold, and stops the water discharge when the received signal is less than the threshold.

In the photoelectric sensor, the effects of electromagnetic noise entering from the outside are suppressed by covering, with a shield member, the periphery of the sensor main body of the light-projecting element, the light receiving element, etc. (e.g., Patent Document 1). The shield member includes, for example, a conductive material such as copper, aluminum, etc. The shield member is electrically connected to a reference potential (e.g., ground) of the sensor main body. Thereby, the incidence of the electromagnetic noise on the sensor main body is suppressed.

In the photoelectric sensor, a light-shielding conductive material such as a metal, etc., cannot be used to cover the front of the light receiving element because the reflected light is undesirably blocked. Therefore, there are cases where the received signal that is output is undesirably unstable due to the electromagnetic noise entering from the front. Unintended fluctuation of the received signal causes erroneous water discharge of the water discharge apparatus; and there is a possibility that the water discharge may be performed even though the object does not exist, or conversely, the water discharge may not be performed even though the object exists.

If the configuration for suppressing the electromagnetic noise entering from the front of the light receiving element becomes complex, this undesirably causes an increase of the manufacturing cost of the photoelectric sensor. Therefore, in the photoelectric sensor and the water discharge apparatus using the photoelectric sensor, it is desirable to suppress the electromagnetic noise entering from the front of the light receiving element by using a simple configuration.

SUMMARY

According to one embodiment, a water discharge apparatus including a water discharger, a water supply path, an opening/closing valve, a photoelectric sensor, and a controller, where the water discharger has a water discharge port discharging water, the water supply path guides the water from a water supply source to the water discharge port, the opening/closing valve opens and closes the water supply path, the photoelectric sensor projects detection light, receives a reflected light of the detection light, and outputs a received signal corresponding to a light reception amount of the reflected light, the controller detects an existence or absence of an object based on the received signal and controls opening and closing of the opening/closing valve according to a detection result of the object, the photoelectric sensor includes a sensor main body and a conductive member, the sensor main body includes a light-projecting element and a light receiving element, the light-projecting element projects the detection light, the light receiving element receives the reflected light, and the conductive member covers a front of the light receiving element, is formed in a sheet configuration, is light-transmissive to the detection light and the reflected light, is conductive, and is electrically connected to a reference potential of the sensor main body.

DETAILED DESCRIPTION

Figure 1:
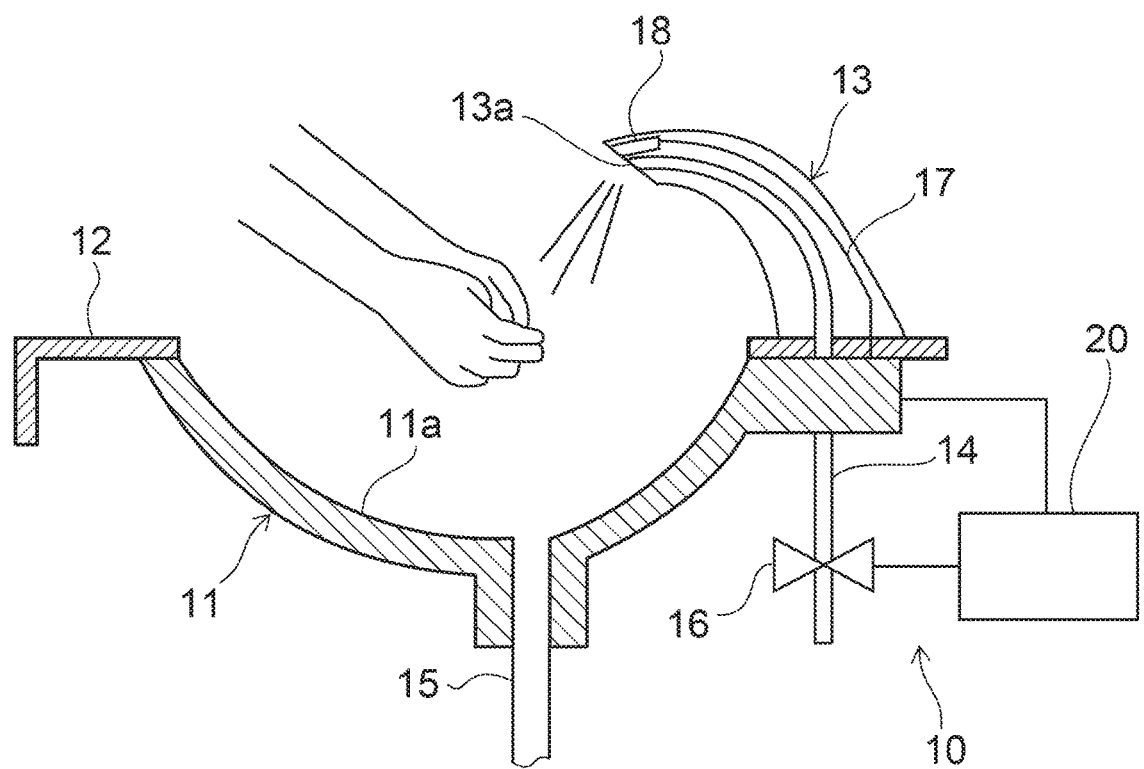
FIG. 1 is a descriptive view illustrating a faucet apparatus according to a first embodiment.

A first invention is a water discharge apparatus including a water discharger, a water supply path, an opening/closing valve, a photoelectric sensor, and a controller, where the water discharger has a water discharge port discharging water, the water supply path guides the water from a water supply source to the water discharge port, the opening/closing valve opens and closes the water supply path, the photoelectric sensor projects detection light, receives a reflected light of the detection light, and outputs a received signal corresponding to a light reception amount of the reflected light, the controller detects an existence or absence of an object based on the received signal and controls opening and closing of the opening/closing valve according to a detection result of the object, the photoelectric sensor includes a sensor main body and a conductive member, the sensor main body includes a light-projecting element and a light receiving element, the light-projecting element projects the detection light, the light receiving element receives the reflected light, and the conductive member covers a front of the light receiving element, is formed in a sheet configuration, is light-transmissive to the detection light and the reflected light, is conductive, and is electrically connected to a reference potential of the sensor main body.

According to the water discharge apparatus, the electromagnetic noise that enters from the front of the light receiving element can be suppressed by the conductive member. The conductive member that has the sheet configuration may be merely disposed at the front of the light receiving element; and the complexity of the configuration also can be suppressed. Accordingly, a water discharge apparatus can be provided in which the electromagnetic noise entering from the front of the light receiving element is suppressed using a simple configuration.

The second invention is the water discharge apparatus of the first invention in which the photoelectric sensor further includes an interior case and a shield member, the interior case holds the sensor main body, the shield member is conductive and surrounds the sensor main body and the interior case, and the shield member includes a tongue part electrically connected to the conductive member.

According to the water discharge apparatus, the incidence of the electromagnetic noise on the sensor main body can be suppressed by the shield member. By providing the tongue part, the conductive member and the shield member can be electrically connected using a simple configuration. For example, the conductive member and the shield member can be electrically connected without soldering or interconnects. That is, the shield member not only suppresses the incidence of the electromagnetic noise but also performs the role of electrically connecting the conductive member to the reference potential, and performs two roles using one member.

A third invention is the water discharge apparatus of the second invention in which a recess housing the tongue part is provided in the outer surface of the interior case.

According to the water discharge apparatus, by providing the recess in the outer surface of the interior case, the protrusion of the tongue part from the outer surface of the interior case is suppressed; and the increase of the size of the entire photoelectric sensor can be suppressed.

A fourth invention is the water discharge apparatus of the second or third invention in which the photoelectric sensor further includes a tubular body, the tubular body surrounds the light receiving element, is conductive, and is light-shielding to the detection light and the reflected light, the tubular body is electrically connected to the reference potential of the sensor main body and is held with the sensor main body by the interior case, and the shield member further surrounds the tubular body.

According to the water discharge apparatus, the electromagnetic noise that is incident on the light receiving element can be suppressed further. Because the tubular body is light-shielding, a portion of the light projected from the light-projecting element that is diffusely reflected and is directly incident on the light receiving element can be suppressed.

A fifth invention is the water discharge apparatus of any one of the first to fourth inventions in which the conductive member is elastic, is conductive, and is electrically connected to the reference potential via the elastic body, and the elastic body is provided between the light-projecting element and the light receiving element.

According to the water discharge apparatus, the conductive member can be electrically connected to the reference potential with higher certainty by the elastic body. In the case where the conductive member is electrically connected to the reference potential via contact, it is desirable for the contact surface area between the conductive member and the contact member to be as wide as possible; but it is difficult to set the contact surface area to be wide due to the raw material and configuration of the contact member contacting the conductive member; and there is a risk that the contact may be substantially point contact, and the contact state may become unstable. For example, in the case where a shield member is used for the electrical connection to the reference potential, it is possible to widen the contact surface area if both the conductive member and the shield member have completely flat surfaces; but it is difficult to actually form the surfaces to be completely flat; and slight distortions and surface roughness undesirably occur. Thus, although the two appear to be electrically connected at a glance, the contact is substantially point contact; and the electrical connection may be undesirably broken by vibrations, temperature changes, etc. Therefore, by using an elastic body that is elastic, it is possible to widen the contact surface area; and it is possible to electrically connect the conductive member with higher certainty to the reference potential. By providing the elastic body between the light-projecting element and the light receiving element, diffusely reflected light from the light-projecting element toward the light receiving element can be blocked by the elastic body. A portion of the light projected from the light-projecting element that is diffusely reflected and is directly incident on the light receiving element can be suppressed.

A sixth invention is the water discharge apparatus of the fifth invention in which the elastic body surrounds the light receiving element in a state in which the light receiving element is viewed from the front.

According to the water discharge apparatus, the unintended incidence on the light receiving element of diffusely reflected light from the light-projecting element or the outside, etc., can be suppressed further.

A seventh invention is the water discharge apparatus of the fifth or sixth invention in which one of the conductive member or the elastic body includes a conductive adhesive layer and is electrically connected via the adhesive layer.

According to the water discharge apparatus, the ease of assembly between the conductive member and the elastic body can be improved. Also, the conductive member and the elastic body can be caused to contact each other with higher certainty. The conductive member and the elastic body can be electrically connected with higher certainty.

An eighth invention is the water discharge apparatus of any one of the first to seventh inventions in which the conductive member covers only the front of the light receiving element.

According to the water discharge apparatus, the attenuation of the detection light when passing through the conductive member is suppressed; and more intense detection light can be projected to the outside. Although the ideal transmittance of the conductive member is 100%, it is difficult to obtain substantially 100%; and the light emission intensity is reduced by the detection light passing through the conductive member. However, there are also cases where the location where the shielding performance is strongly needed is the light receiving element and light receiving circuit periphery, and the shielding performance as the photoelectric sensor is sufficient even without shielding the periphery of the light-projecting element. In such a case, the necessity to shield the front of the light-projecting element using the conductive member is low; and it is sufficient to shield only the front of the light receiving element. That is, more intense detection light can be projected to the outside while maintaining the shielding resilience as the photoelectric sensor.

A ninth invention is a water discharge apparatus of any one of the first to seventh inventions, wherein the conductive member covers the front of the sensor main body and has an opening exposing the light-projecting element.

According to the water discharge apparatus, the attenuation of the detection light when passing through the conductive member is suppressed; and more intense detection light can be projected to the outside. Although the ideal transmittance of the conductive member is 100%, it is difficult to obtain substantially 100%; and the light emission intensity is reduced by the detection light passing through the conductive member. However, there are also cases where the location where the shielding performance is strongly needed is the light receiving element and light receiving circuit periphery, and the shielding performance as the photoelectric sensor is sufficient even without shielding the periphery of the light-projecting element. In such a case, the necessity to shield the front of the light-projecting element using the conductive member is low; and it is sufficient to shield only the front of the light receiving element. That is, more intense detection light can be projected to the outside while maintaining the shielding resilience as the photoelectric sensor.

A tenth invention is the water discharge apparatus of any one of the first to ninth inventions, in which the conductive member includes a conductive film and a light-transmissive substrate part, the conductive film is provided on one surface of the substrate part, and the configuration of the conductive member when viewed from the front is different between when the conductive film faces the light receiving element side and when the conductive film faces the side opposite to the light receiving element.

According to the water discharge apparatus, in the case where the conductive film is provided only on one surface of the substrate part, the orientation of the mounting of the conductive member is determined uniquely; and the ease of assembly can be improved further. The undesirable mounting of the conductive member in the reverse orientation can be suppressed.

An eleventh invention is the water discharge apparatus of any one of the first to tenth inventions in which the photoelectric sensor further includes a polarizing member provided at the front of the conductive member.

According to the water discharge apparatus, the erroneous water discharge due to the incidence of specularly reflected light can be suppressed.

A twelfth invention is the water discharge apparatus of the eleventh invention in which the polarizing member is formed as one body with the conductive member.

According to the water discharge apparatus, the number of parts is reduced; and the ease of assembly can be improved.

A thirteenth invention is the water discharge apparatus of any one of the first to seventh inventions, in which the conductive member covers the front of the sensor main body and has a trench part that is provided at a position opposing a portion between the light-projecting element and the light receiving element.

According to the water discharge apparatus, the incidence on the light receiving element of the light diffusely reflected by the conductive member can be suppressed by the trench part. A portion of the light projected from the light-projecting element that is diffusely reflected and is directly incident on the light receiving element can be suppressed.

A fourteenth invention is the water discharge apparatus of the second invention in which the interior case has a front surface and a trench part, the front surface extends between the light-projecting element and the light receiving element, and the trench part is provided in the front surface.

According to the water discharge apparatus, the incidence on the light receiving element of the light diffusely reflected by the conductive member can be suppressed by the trench part. A portion of the light projected from the light-projecting element that is diffusely reflected and is directly incident on the light receiving element can be suppressed.

A fifteenth invention is the water discharge apparatus of the third invention in which the interior case has a front surface extending between the light-projecting element and the light receiving element, and a recess is provided in the front surface.

According to the water discharge apparatus, the incidence on the light receiving element of the light diffusely reflected by the conductive member can be suppressed by the recess while suppressing the increase of the size of the entire photoelectric sensor due to the protrusion of the tongue part from the front surface of the interior case.

A sixteenth invention is a photoelectric sensor including a sensor main body and a conductive member, where the sensor main body includes a light-projecting element projecting detection light, includes a light receiving element receiving reflected light of the detection light, and outputs a received signal corresponding to a light reception amount of the reflected light, and the conductive member is formed in a sheet configuration, covers the front of the light receiving element, is light-transmissive to the detection light and the reflected light, is conductive, and is electrically connected to a reference potential of the sensor main body.

According to the photoelectric sensor, the electromagnetic noise that enters from the front of the light receiving element can be suppressed by the conductive member. The conductive member that has the sheet configuration may be merely disposed at the front of the light receiving element; and the complexity of the configuration also can be suppressed. Accordingly, a photoelectric sensor can be provided in which the electromagnetic noise entering from the front of the light receiving element is suppressed using a simple configuration.

Embodiments will now be described with reference to the drawings. Similar components in the drawings are marked with the same reference numerals; and a detailed description is omitted as appropriate.

First Embodiment

FIG. 1 is a descriptive view illustrating a faucet apparatus according to a first embodiment.

As illustrated in FIG. 1, the faucet apparatus 10 (the water discharge apparatus) performs automatic water discharge and shutoff by detecting an object (a human body, an object, etc.) and performs the water discharge and shutoff for a wash basin 11 provided in a washstand.

The wash basin 11 is provided in the upper surface of a washing counter 12. A faucet 13 (a water discharger) that includes a spout for discharging water toward a bowl surface 11a of the wash basin 11 is provided on the washing counter 12. The faucet 13 has a water discharge port 13a that discharges the water and is provided so that the water that is discharged from the water discharge port 13a is discharged inside the bowl surface 11a of the wash basin 11.

The water that the faucet 13 discharges from the water discharge port 13a is supplied by a water supply path 14. The water supply path 14 guides the water supplied from a water supply source such as a service-water pipe, etc., toward the water discharge port 13a. A drainage water path 15 is connected to the wash basin 11. The drainage water path 15 drains the water discharged from the water discharge port 13a into the bowl surface 11a of the wash basin 11.

The faucet apparatus 10 includes a solenoid valve 16 (an opening/closing valve), a photoelectric sensor 18, and a controller 20. The photoelectric sensor 18 is separated from the controller 20. For example, the photoelectric sensor 18 is housed in the interior of the faucet 13. For example, the photoelectric sensor 18 is provided above the water discharge port 13a in the tip of the faucet 13.

For example, the solenoid valve 16 and the controller 20 are housed at the lower side of the washstand. For example, the solenoid valve 16 and the controller 20 are housed inside a cabinet (not illustrated) provided below the washing counter 12.

The photoelectric sensor 18 and the controller 20 are connected by a connection cable 17. For example, the controller 20 supplies a power supply voltage to the photoelectric sensor 18 via the connection cable 17 and controls the photoelectric sensor 18 via the connection cable 17.

The solenoid valve 16 is provided in the water supply path 14 and performs the opening and closing of the water supply path 14. When the solenoid valve 16 opens, the state is switched to a water discharge state in which the water supplied from the water supply path 14 is discharged from the water discharge port 13a; and when the solenoid valve 16 closes, the state is switched to a water shutoff state in which the water supplied from the water supply path 14 is not discharged from the water discharge port 13a.

The solenoid valve 16 is connected to the controller 20; and the controller 20 controls the open/close operation by operating the solenoid valve 16. The solenoid valve 16 is electrically controlled according to a control signal from the controller 20 and performs the opening and closing of the water supply path 14. Thus, the solenoid valve 16 functions as a water supply valve that opens and closes the water supply path 14 of the water discharged from the water discharge port 13a.

The solenoid valve 16 is a self-holding solenoid valve (a latch-type solenoid valve) called a latching solenoid valve, and has an operation (an open operation) from the closed state to the open state when a flow of current is provided to the solenoid coil in one direction, subsequently maintains the open state even when the flow of current to the solenoid coil is turned off, has an operation (a close operation) from the open state to the closed state when a flow of current is provided to the solenoid coil in the other direction, and subsequently maintains the closed state even when the flow of current to the solenoid coil is turned off. The opening and closing of the water supply path 14 is not limited to the solenoid valve 16 and may be performed by another opening/closing valve mechanism that can open and close the water supply path 14 according to the control of the controller 20.

The photoelectric sensor 18 detects the object (the hand, etc.) approaching the water discharge port 13a. The water discharge target region of the water discharge port 13a is used as the detection region of the photoelectric sensor 18.

The photoelectric sensor 18 detects the position, movement, etc., of the object such as the human body, etc., by projecting detection light and by receiving a reflected light of the detection light reflected from the object.

For example, the photoelectric sensor 18 projects infrared light as the detection light. The detection light may be, for example, visible light, etc. "Infrared light" is, for example, light of a wavelength of not less than 0.7 μm and not more than 1000 μm.

The photoelectric sensor 18 is provided in the interior of the faucet 13 proximal to the water discharge port 13a and is disposed to project the detection light toward the user side (in FIG. 1, the left side) of the washstand. Thereby, the photoelectric sensor 18 makes it possible to detect when a human body approaches the water discharge port 13a, when a hand reaches toward the water discharge port 13a from the human body approaching the water discharge port 13a, etc.

The photoelectric sensor 18 inputs, via the connection cable 17 to the controller 20, a received signal corresponding to a light reception amount of the reflected light. The controller 20 detects the existence or absence of the object based on the received signal input from the photoelectric sensor 18. For example, the controller 20 detects the position, movement, etc., of the object based on the received signal. Then, the controller 20 controls the open/close operation of the solenoid valve 16 based on the detection result. The controller 20 controls the sensing operation of the photoelectric sensor 18 by outputting a control signal to the photoelectric sensor 18.

As described above, the faucet apparatus 10 of the embodiment includes the solenoid valve 16, the photoelectric sensor 18, and the controller 20; and the open/close operation of the solenoid valve 16 is controlled by controlling the controller 20 based on the received signal of the photoelectric sensor 18. Thereby, the water discharge is performed according to the detection result of the object (the movement, etc., of the user of the washstand) approaching the water discharge port 13a. The controller 20 performs the water discharge according to the detection of the object and stops the water discharge according to the nondetection of the object. In other words, in the faucet apparatus 10, the water discharge is performed automatically while the hand or the like of the user reaches out to be proximal to the water discharge port 13a.

The photoelectric sensor 18 is not operated constantly; and the controller 20 performs the control so that the sensing is operated at the necessary timing. Thereby, the power consumption of the photoelectric sensor 18 can be reduced. For example, the controller 20 reduces the frequency of the sensing operation of the photoelectric sensor 18 to a level where the user is not inconvenienced. Thereby, the power consumption reduction of the entire faucet apparatus 10 can be realized.

Figure 2:
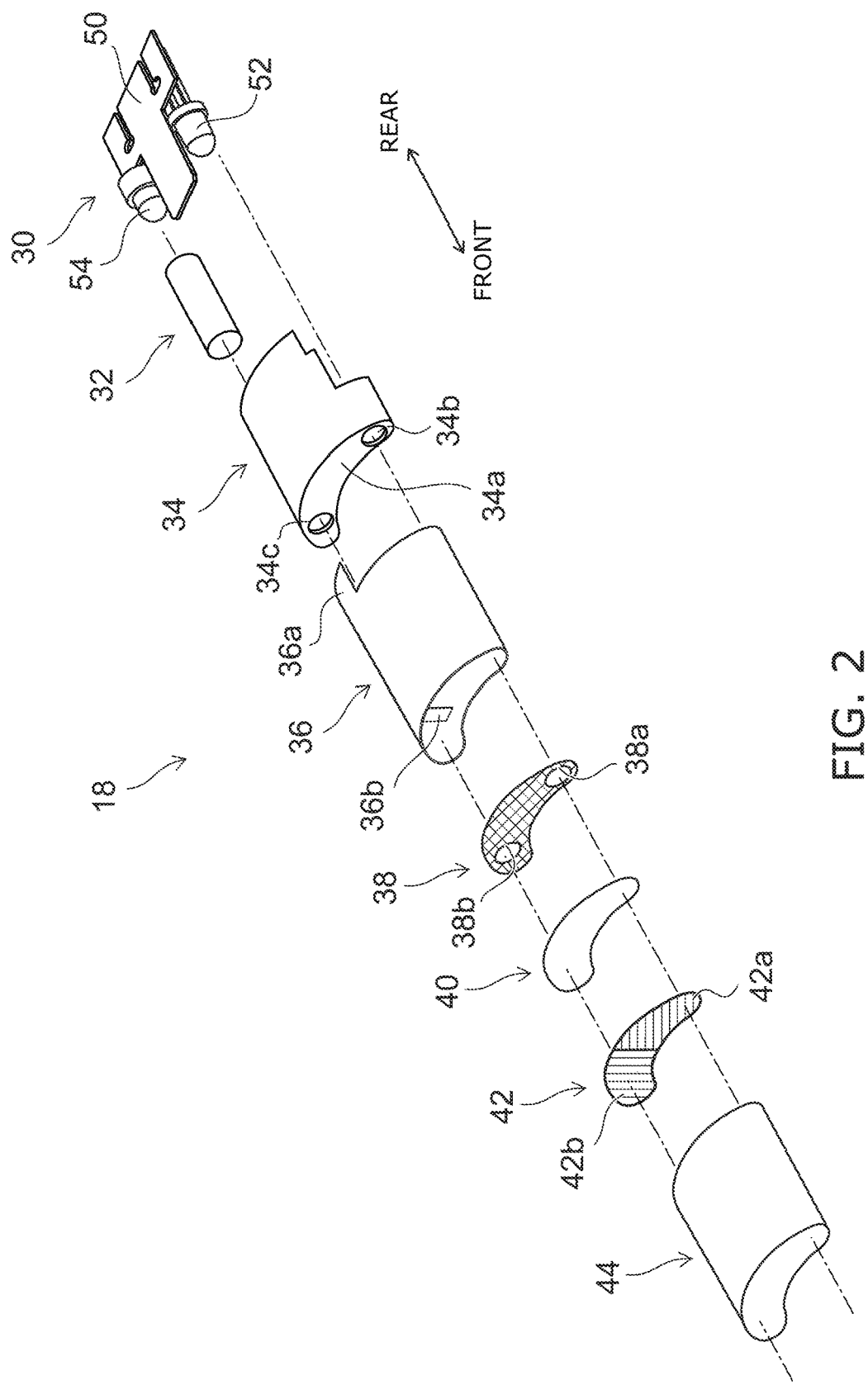
FIG. 2 is an exploded perspective view illustrating the photoelectric sensor according to the first embodiment.

FIG. 2 is an exploded perspective view illustrating the photoelectric sensor according to the first embodiment.

As illustrated in FIG. 2, the photoelectric sensor 18 includes a sensor main body 30, a tubular body 32, an interior case 34, a shield member 36, an elastic body 38, a conductive member 40, a polarizing plate 42 (a polarizing member), and a sensor case 44.

The sensor main body 30 includes a substrate 50, a light-projecting element 52, and a light receiving element 54. The light-projecting element 52 and the light receiving element 54 are mounted to the substrate 50. For example, a light projection circuit that operates the light-projecting element 52, a light receiving circuit that operates the light receiving element 54, etc., are provided in the substrate 50.

The light-projecting element 52 projects detection light. For example, the light-projecting element 52 projects non-polarized (natural light) infrared light. The light-projecting element 52 includes, for example, a light-emitting element such as an LED (Light Emitting Diode), etc. The light-projecting element 52 projects the detection light toward the front. Hereinbelow, the direction in which the light-projecting element 52 projects the detection light is taken as the "front;" and the direction opposite to the "front" is taken as the "rear."

The light receiving element 54 receives reflected light. The light receiving element 54 is provided to be able to receive the reflected light entering from the front. For example, the light receiving element 54 is arranged with the light-projecting element 52 and faces substantially the same direction as the light-projecting element 52. In other words, the light receiving element 54 is provided to face the front. The optical axis of the light receiving element 54 is substantially parallel to the optical axis of the light-projecting element 52. Thereby, the reflected light that is reflected by the object, etc., travels from the front toward the rear and is incident on the light receiving element 54. The light receiving element 54 includes, for example, a phototransistor and/or a photodiode that is sensitive to infrared light. The sensor main body 30 outputs, to the controller 20, a received signal corresponding to the light reception amount of the reflected light.

The tubular body 32 has a tubular configuration extending in the frontward/rearward direction. The light receiving element 54 is inserted through the tubular body 32. Thereby, the tubular body 32 surrounds the light receiving element 54. The tubular body 32 surrounds the light receiving element 54 around the axis of the frontward/rearward direction. In other words, the tubular body 32 surrounds the side of the light receiving element 54.

The tubular body 32 is conductive. The tubular body 32 includes, for example, a metal material such as copper, aluminum, etc. The tubular body 32 is, for example, a metal pipe. Accordingly, the tubular body 32 is light-shielding to the detection light and the reflected light. The tubular body 32 is electrically connected to a reference potential (e.g., a ground potential) of the sensor main body 30. In other words, the tubular body 32 is set to substantially the same potential as the reference potential of the sensor main body 30. For example, the tubular body 32 is electrically connected to the reference potential of the sensor main body 30 by being electrically connected to a pattern of the substrate 50 having the reference potential by being soldered to the substrate 50 in a state of surrounding the light receiving element 54.

The interior case 34 holds the sensor main body 30. In the example, the interior case 34 also holds the tubular body 32 with the sensor main body 30. For example, the interior case 34 is insulative. Also, for example, the interior case 34 is light-shielding to the detection light projected by the light-projecting element 52. The interior case 34 includes, for example, a black resin material.

For example, the interior case 34 has an interior space open toward the rear and formed to correspond to the configurations of the sensor main body 30 and the tubular body 32. The interior case 34 holds the sensor main body 30 and the tubular body 32 by inserting the sensor main body 30 and the tubular body 32 through the interior space from the rearward side.

The interior case 34 has a front surface 34a facing the front, and a pair of openings 34b and 34c provided in the front surface 34a. The opening 34b exposes the light-projecting element 52 inserted through the interior space frontward. The opening 34c exposes the light receiving element 54 inserted through the interior space frontward. Thereby, the detection light is emitted from inside the interior case 34 via the opening 34b; and the reflected light enters the interior case 34 via the opening 34c.

The shield member 36 surrounds the sensor main body 30 and the interior case 34. In the example, the shield member 36 further surrounds the tubular body 32. The shield member 36 has a tubular configuration extending in the frontward/rearward direction. The shield member 36 surrounds the sensor main body 30, the interior case 34, and the tubular body 32 around the axis of the frontward/rearward direction. The shield member 36 exposes the openings 34b and 34c in a state of surrounding the parts. In other words, the shield member 36 exposes the light-projecting element 52 and the light receiving element 54 frontward.

The shield member 36 is conductive. The shield member 36 includes, for example, a metal material such as copper, aluminum, etc. Accordingly, the shield member 36 is light-shielding to the detection light and the reflected light. The shield member 36 may be sheet metal or may be a metal tape wound onto the perimeter surface of the interior case 34, etc.

The shield member 36 is electrically connected to the reference potential of the sensor main body 30. For example, the shield member 36 is electrically connected to the reference potential of the sensor main body 30 by being electrically connected to a pattern having the reference potential of the substrate 50 by soldering, interconnects, etc.

Thus, the sensor main body 30 is surrounded with the shield member 36. Thereby, the incidence of the electromagnetic noise on the sensor main body 30 from a direction orthogonal to the frontward/rearward direction is suppressed. In the example, the tubular body 32 further surrounds only the light receiving element 54 inside the shield member 36. Thereby, the electromagnetic noise that is incident on the light receiving element 54 can be suppressed further.

The shield member 36 also includes a bent part 36a. The bent part 36a extends toward the rear from the rear end of the shield member 36. The bent part 36a covers the rear of the light receiving element 54 by being bent after the interior case 34 is surrounded with the shield member 36. Thereby, the electromagnetic noise that is incident on the light receiving element 54 from the rear also can be suppressed.

The tubular body 32 and the bent part 36a may be omitted in the case where sufficient electromagnetic shield properties are obtained using only the shield member 36. Thus, the tubular body 32 and the bent part 36a are provided as necessary and are omissible.

It is unnecessary for the shield member 36 to completely surround the sensor main body 30; and if sufficient electromagnetic shield properties are obtained, the surrounding portion may not be provided partially. For example, the location where the shielding performance is strongly needed is the light receiving element 54 and light receiving circuit periphery; and there are also cases where the shielding performance as the photoelectric sensor 18 is sufficient even without shielding the periphery of the light-projecting element 52. In such a case, the periphery of the light-projecting element 52 may not be surrounded with the shield member 36. That is, it is sufficient for the sensor main body 30 to be surrounded with the shield member 36 within a range in which the shielding performance of the photoelectric sensor 18 can be maintained.

The shield member 36 includes a tongue part 36b. The tongue part 36b is provided at the front end of the shield member 36 and is bent toward the inner side. For example, the tongue part 36b contacts the front surface 34a of the interior case 34 in a state in which the shield member 36 surrounds the interior case 34. The tongue part 36b is disposed at a position not overlapping the openings 34b and 34c. For example, the tongue part 36b is provided between the openings 34b and 34c in the state viewed from the front. In other words, the tongue part 36b is provided between the light-projecting element 52 and the light receiving element 54 in the state viewed from the front.

The elastic body 38 is elastic and conductive. For example, the elastic body 38 has a sponge configuration and has elasticity in the thickness direction. In other words, the elastic body 38 is a cushion-like cushion electrode. The elastic body 38 includes, for example, a conductive nonwoven cloth. The elastic body 38 may be, for example, conductive rubber, a conductive spring, etc.

In the example, the configuration of the elastic body 38 is substantially the same as the configuration of the front surface 34a of the interior case 34. The elastic body 38 contacts the front surface 34a of the interior case 34 and the tongue part 36b of the shield member 36. Thereby, the elastic body 38 is electrically connected to the reference potential of the sensor main body 30 via the shield member 36.

The elastic body 38 has a pair of openings 38a and 38b. The opening 38a exposes the light-projecting element 52 and the opening 34b of the interior case 34 frontward. The opening 38b exposes the light receiving element 54 and the opening 34c of the interior case 34 frontward. In other words, in the state viewed from the front, the opening 38a of the elastic body 38 surrounds the light-projecting element 52. In the state viewed from the front, the opening 38b of the elastic body 38 surrounds the light receiving element 54.

In the state viewed from the front, a portion of the elastic body 38 is provided between the light-projecting element 52 and the light receiving element 54. The configuration of the elastic body 38 is not limited to that recited above and may be any configuration in which at least a portion is provided between the light-projecting element 52 and the light receiving element 54 in the state viewed from the front. For example, the elastic body 38 may have a configuration provided at only a portion between the light-projecting element 52 and the light receiving element 54.

The conductive member 40 is formed in a sheet configuration and covers the front of the light receiving element 54. In the example, the configuration of the conductive member 40 is substantially the same as the configuration of the front surface 34a of the interior case 34. Thereby, the conductive member 40 covers the front of the entire sensor main body 30. The conductive member 40 is provided at the front of the elastic body 38 and is provided on the front surface 34a of the interior case 34 with the elastic body 38 interposed.

The conductive member 40 is conductive and is light-transmissive to the detection light and the reflected light. For example, the conductive member 40 is transparent. In other words, the conductive member 40 is a transparent electrode. The detection light that is projected from the light-projecting element 52 passes through the conductive member 40 and travels frontward; and the reflected light passes through the conductive member 40 and is incident on the light receiving element 54. The conductive member 40 includes, for example, ITO (Indium-Titanium-Oxide), etc. The material of the conductive member 40 may be any material that is light-transmissive and conductive. For example, a metal wire that is formed in a lattice configuration on a light-transmissive resin may be used as the conductive member 40. It is sufficient for at least a portion of the conductive member 40 to be light-transmissive; and a portion of the conductive member 40 may include a light-shielding portion.

The conductive member 40 contacts the elastic body 38. Thereby, the conductive member 40 is electrically connected to the reference potential of the sensor main body 30 via the elastic body 38 and the tongue part 36b of the shield member 36. Thus, the tongue part 36b of the shield member 36 is used in the electrical connection of the conductive member 40.

In the example, the elastic body 38 is provided between the conductive member 40 and the tongue part 36b of the shield member 36. Thereby, for example, the adhesion between the conductive member 40 and the tongue part 36b can be increased. For example, the conductive member 40 can be electrically connected with higher certainty to the reference potential. The elastic body 38 may be omitted in the case where the appropriate electrical connection is obtained in the state in which the conductive member 40 is in direct contact with the tongue part 36b. The elastic body 38 is provided as necessary and is omissible. The method for electrically connecting the conductive member 40 and the reference potential of the sensor main body 30 is not limited to that recited above and may be any method.

Thus, the light-transmissive conductive member 40 is provided at the front of the sensor main body 30; and the conductive member 40 is electrically connected to the reference potential of the sensor main body 30. Thereby, the electromagnetic noise that is incident on the sensor main body 30 (the light receiving element 54) from the front also can be suppressed.

In the example, the conductive member 40 has a planar sheet configuration and is disposed to be substantially orthogonal to the frontward/rearward direction. In other words, the conductive member 40 is disposed to be substantially orthogonal to the optical axis of the light-projecting element 52 and the optical axis of the light receiving element 54. Thereby, for example, the configuration of the conductive member 40 can be simple. The electromagnetic noise that is incident on the sensor main body 30 from the front can be suppressed using a simple configuration.

By providing the conductive member 40 to be substantially orthogonal to the optical axis of the light-projecting element 52, the reflection of the detection light at the surface of the conductive member 40 can be suppressed. Similarly, by providing the conductive member 40 to be substantially orthogonal to the optical axis of the light receiving element 54, the reflection of the reflected light at the surface of the conductive member 40 can be suppressed. In other words, the utilization efficiency of the light projected from the light-projecting element 52 can be increased.

The polarizing plate 42 is provided at the front of the conductive member 40. In other words, the polarizing plate 42 is provided between the conductive member 40 and the sensor case 44. The polarizing plate 42 includes a first region 42a covering the front of the light-projecting element 52, and a second region 42b covering the front of the light receiving element 54. Of the non-polarized infrared light (the detection light) projected from the light-projecting element 52, the first region 42a transmits only the component of a first polarization. Of the reflected light, the second region 42b transmits only the component of a second polarization. The first polarization is, for example, a perpendicular-direction linear polarization; and the second polarization is, for example, a horizontal-direction linear polarization. In such a case, the polarization direction of the second polarization is different from the polarization direction of the first polarization. The first polarization and the second polarization are not limited to those recited above and may be a linear polarization in any direction. Also, the second polarization is not limited to a linear polarization in a direction orthogonal to the first polarization and may be a linear polarization in any polarization direction that is different from the polarization direction of the first polarization.

For example, the detection light becomes perpendicular-direction linearly polarized light by passing through the first region 42a of the polarizing plate 42. The reflection at the human body is a diffuse reflection. Therefore, in the case where the detection light is reflected by the human body, the reflected light becomes non-polarized light. Accordingly, in such a case, the component of the horizontal-direction linearly polarized light included in the reflected light passes through the second region 42b of the polarizing plate 42 and is incident on the light receiving element 54. Thereby, the detecting of the object is possible.

On the other hand, in the case where the detection light is specularly reflected by a metal wash basin 11, etc., the polarization state is maintained. Therefore, the transmission is suppressed for the reflected light that has the perpendicular-direction linear polarization and is incident on the second region 42b. Thereby, the reflected light that has a relatively high intensity due to the specular reflection, is incident on the light receiving element 54, and causes an undesirable misdetection state can be suppressed.

Thus, by providing the polarizing plate 42, the erroneous water discharge due to the specular reflection can be suppressed. In such a case, the polarizing plate 42 is provided at the front of the conductive member 40. Thereby, even if the polarization is disturbed when passing through the conductive member 40, the effects of the erroneous water discharge due to the specular reflection can be suppressed to substantially about the same as the state in which there is no conductive member 40. That is, there are no effects even when the polarization of the non-polarized infrared light projected from the light-projecting element 52 is disturbed up to just before passing through the first region 42a of the polarizing plate 42; and there are no effects even when the polarization of the infrared light reflected by the reflection object is disturbed after passing through the second region 42b of the polarizing plate 42.

The first polarization and the second polarization are not limited to linear polarizations and may be circular polarizations, elliptical polarizations, etc. For circular polarization and elliptical polarization, the polarization state reverses when specularly reflected. For example, right-handed circularly polarized light becomes left-handed circularly polarized light when specularly reflected. Accordingly, in the case where circular polarization or elliptical polarization is used, the polarization direction of the second polarization is set to be substantially the same as the polarization direction of the first polarization. For example, the first region 42a and the second region 42b are provided as right-handed circular polarization polarizing plates. In the case where the detection light is diffusely reflected, the right-handed circular polarization component that is included in the non-polarized reflected light passes through the second region 42b; and the detecting of the object is possible. On the other hand, in the case where the detection light is specularly reflected, the left-handed circular polarization reflected light is blocked by the second region 42b. Thereby, similarly to the case of the linear polarization, the erroneous water discharge due to the specular reflection is suppressed.

In the example, one polarizing plate 42 that includes the first region 42a and the second region 42b is provided. This is not limited thereto; for example, two polarizing plates that include the polarizing plate including the first region 42a and the polarizing plate including the second region 42b may be arranged. Also, the formation of the first region 42a and the formation of the second region 42b are not limited to polarizing plates and may be any polarizing member that can transmit and block the prescribed polarized light.

The sensor case 44 has a substantially open box configuration that is open toward the rear. In other words, the sensor case 44 has a tubular configuration in which an end is closed. The sensor case 44 houses the parts such as the sensor main body 30, the tubular body 32, the interior case 34, the shield member 36, the elastic body 38, the conductive member 40, the polarizing plate 42, etc., in the space of the interior of the sensor case 44. For example, the sensor case 44 houses all of the parts recited above in the interior of the sensor case 44. Accordingly, the exterior configuration of the photoelectric sensor 18 after assembling the parts is substantially the same as the exterior configuration of the sensor case 44. For example, the sensor case 44 protects the parts from impact, dust, water drops (water vapor), etc. In other words, the sensor case 44 is an exterior cover.

The sensor case 44 is light-transmissive to the detection light and the reflected light. The sensor case 44 includes, for example, a transparent resin material, etc. It is unnecessary for the entire sensor case 44 to be light-transmissive; and it is sufficient for at least the portions transmitting the detection light and the reflected light to be light-transmissive.

In the example, the parts of the interior case 34, the shield member 36, the elastic body 38, the conductive member 40, the polarizing plate 42, and the sensor case 44 are formed in configurations curved in circular arc-like configurations to match the curvature of the faucet 13 to efficiently dispose the photoelectric sensor 18 in the interior of the faucet 13 having the cylindrical configuration. The configurations of the parts of the interior case 34, the shield member 36, the elastic body 38, the conductive member 40, the polarizing plate 42, and the sensor case 44 are not limited to those recited above and may be any configuration.

Figure 3A:
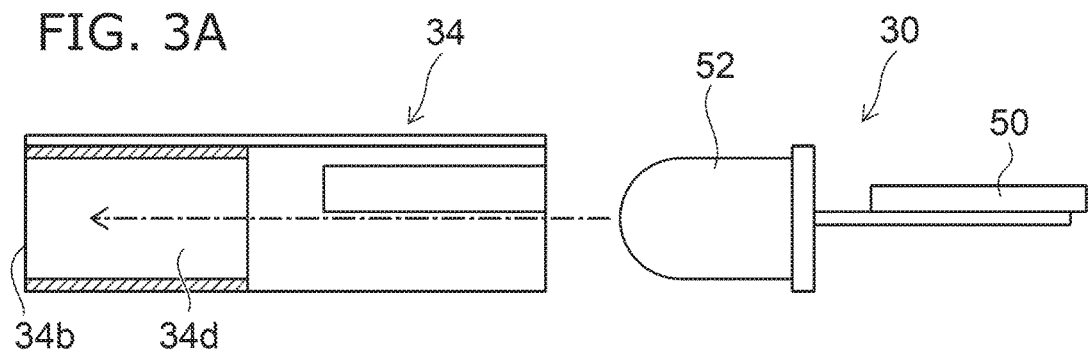
FIG. 3A and FIG. 3B are cross-sectional views illustrating the sensor main body and the interior case according to the first embodiment.
Figure 3B:
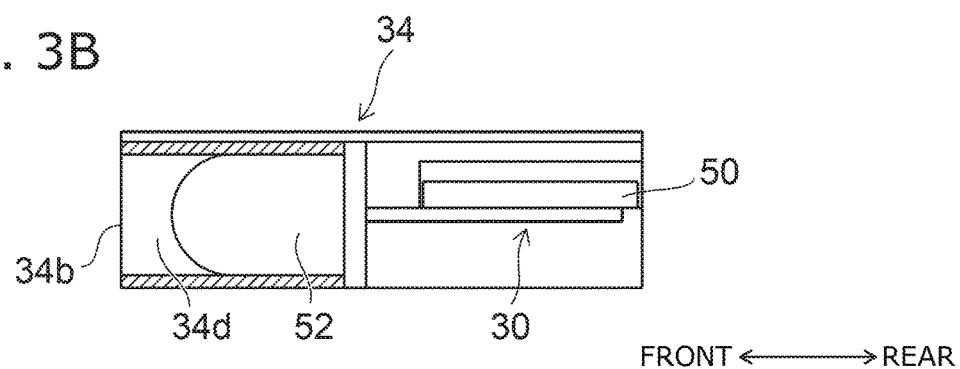

FIG. 3A and FIG. 3B are cross-sectional views illustrating the sensor main body and the interior case according to the first embodiment.

FIG. 3A illustrates the state prior to the sensor main body 30 being held by the interior case 34; and FIG. 3B illustrates the state in which the sensor main body 30 is held by the interior case 34.

As illustrated in FIG. 3A and FIG. 3B, the interior case 34 includes a tubular part 34d. The tubular part 34d has a tubular configuration extending in the frontward/rearward direction and surrounds the light-projecting element 52 around the axis of the frontward/rearward direction. In other words, the tubular part 34d surrounds the light-projecting element 52 around the optical axis of the light-projecting element 52. In other words, the opening 34b is the opening end on the front side of the tubular part 34d. The opening 34b is positioned frontward of the front end of the light-projecting element 52 in the state of being held by the interior case 34.

As described above, for example, the interior case 34 is light-shielding to the detection light projected by the light-projecting element 52. Thus, the light-projecting element 52 is surrounded with the light-shielding interior case 34. Thereby, the orientation of the detection light in a direction (sideward) orthogonal to the frontward/rearward direction can be suppressed. For example, the undesirable reception of the detection light directly by the light receiving element 54 inside the photoelectric sensor 18 (the sensor case 44) can be suppressed.

For example, in the case where the photoelectric sensor 18 is disposed at the vicinity of the water discharge port 13a inside the faucet 13, there are cases where electromagnetic noise generated by the power supply is undesirably incident on the photoelectric sensor 18 from the front via a metal faucet 13.

Conversely, in the photoelectric sensor 18 and the faucet apparatus 10 according to the embodiment, the electromagnetic noise that enters from the front of the light receiving element 54 can be suppressed by the conductive member 40. Even in the case where the photoelectric sensor 18 is disposed inside the faucet 13, the electromagnetic noise that is incident on the light receiving element 54 from the front via the faucet 13 can be suppressed.

As a result of diligent investigations, the inventor of the application obtained the knowledge that the light receiving element 54 of the photoelectric sensor 18 is most affected by the electromagnetic noise. Accordingly, the effects of electromagnetic noise on the sensor main body 30 can be suppressed by covering at least the front of the light receiving element 54. In the photoelectric sensor 18, the conductive member 40 covers the front of the entire sensor main body 30. In such a case, the effects of electromagnetic noise on the sensor main body 30 can be suppressed further.

The conductive member 40 that has the sheet configuration may be merely disposed at the front of the light receiving element 54; and the complexity of the configuration also can be suppressed. Accordingly, the electromagnetic noise that enters from the front of the light receiving element 54 can be suppressed using a simple configuration.

In the faucet apparatus 10 and the photoelectric sensor 18, the incidence of the electromagnetic noise on the sensor main body 30 can be suppressed by the shield member 36. For example, the undesirable fluctuation of the received signal due to the electromagnetic noise being incident on the light receiving circuit provided in the substrate 50 can be suppressed. By providing the tongue part 36b, the conductive member 40 and the shield member 36 can be electrically connected by a simple configuration. For example, the conductive member 40 and the shield member 36 can be electrically connected without soldering or interconnects. That is, the shield member 36 not only suppresses the incidence of the electromagnetic noise but also performs the role of electrically connecting the conductive member 40 to the reference potential, and performs two roles using one member.

In the faucet apparatus 10 and the photoelectric sensor 18, the tubular body 32 surrounds the light receiving element 54; and the shield member 36 further surrounds the tubular body 32. Thereby, the electromagnetic noise that is incident on the light receiving element 54 can be suppressed further. Because the tubular body 32 is light-shielding, a portion of the light projected from the light-projecting element 52 that is diffusely reflected and is directly incident on the light receiving element 54 can be suppressed.

In the faucet apparatus 10 and the photoelectric sensor 18, the conductive member 40 is electrically connected to the reference potential of the sensor main body 30 via the elastic body 38 that is elastic and conductive. Thereby, the conductive member 40 can be electrically connected to the reference potential with higher certainty by the elastic body 38. In the case where the conductive member 40 is electrically connected to the reference potential via contact, it is desirable for the contact surface area between the conductive member 40 and the contact member to be as wide as possible; but it is difficult to set the contact surface area to be wide due to the raw material and configuration of the contact member contacting the conductive member 40; and there is a risk that the contact may be substantially point contact, and the contact state may become unstable. For example, in the case where the shield member 36 is used for the electrical connection to the reference potential, it is possible to widen the contact surface area if both the conductive member 40 and the shield member 36 have completely flat surfaces; but it is difficult to actually form the surfaces to be completely flat; and slight distortions and surface roughness undesirably occur. Thus, although the two appear to be electrically connected at a glance, the contact is substantially point contact; and the electrical connection may be undesirably broken by vibrations, temperature changes, etc. Therefore, by using an elastic body 38 that is elastic, it is possible to widen the contact surface area; and it is possible to electrically connect the conductive member 40 with higher certainty to the reference potential. By providing the elastic body 38 between the light-projecting element 52 and the light receiving element 54 in the state viewed from the front, the diffusely reflected light from the light-projecting element 52 toward the light receiving element 54 can be blocked by the elastic body 38. A portion of the light projected from the light-projecting element 52 that is diffusely reflected and is directly incident on the light receiving element 54 can be suppressed.

In the faucet apparatus 10 and the photoelectric sensor 18, the elastic body 38 surrounds the light receiving element 54 in the state viewed from the front. Thereby, the undesirable and unintended incidence on the light receiving element 54 of the diffusely reflected light from the light-projecting element 52 or the outside, etc., can be suppressed further.

In the faucet apparatus 10 and the photoelectric sensor 18, because the polarizing plate 42 provided at the front of the conductive member 40 is included, the erroneous water discharge due to the incidence of the specularly reflected light can be suppressed as described above.

Figure 4:
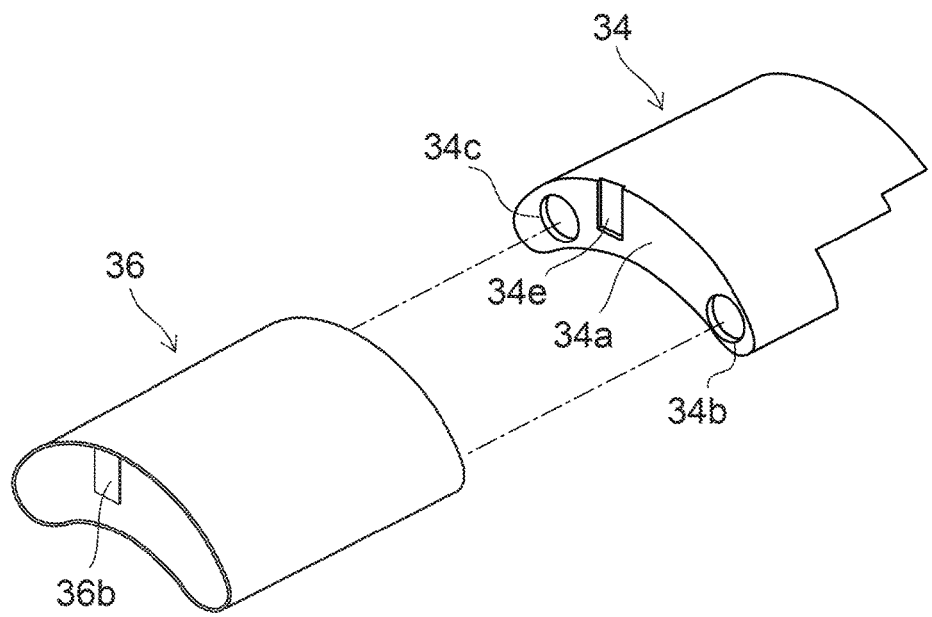
FIG. 4 is a perspective view illustrating a modification of the interior case according to the first embodiment.

FIG. 4 is a perspective view illustrating a modification of the interior case according to the first embodiment.

In the example as illustrated in FIG. 4, the interior case 34 has a recess 34e. The recess 34e is provided in the front surface 34a of the interior case 34. The recess 34e houses the tongue part 36b of the shield member 36.

The depth (the distance from the front surface 34a) of the recess 34e corresponds to the thickness of the tongue part 36b. The depth of the recess 34e is substantially the same as the thickness of the tongue part 36b. The thickness of the tongue part 36b is, for example, not less than 0.1 mm and not more than 0.5 mm. In the state viewed from the front, the recess 34e is substantially the same as the configuration of the tongue part 36b when viewed from the front.

Thus, by providing the recess 34e in the front surface 34a of the interior case 34, the protrusion of the tongue part 36b from the front surface 34a of the interior case 34 can be suppressed. For example, the increase of the size of the entire photoelectric sensor 18 can be suppressed. In the example, the increase of the length in the frontward/rearward direction of the photoelectric sensor 18 can be suppressed.

The position in the shield member 36 where the tongue part 36b is provided may be any position where the electrical connection to the conductive member 40 is possible. The recess 34e is not limited to the front surface 34a of the interior case 34 and may be at any position of the outer surface of the interior case 34 corresponding to the position of a tongue part 36e.

Figure 5A:
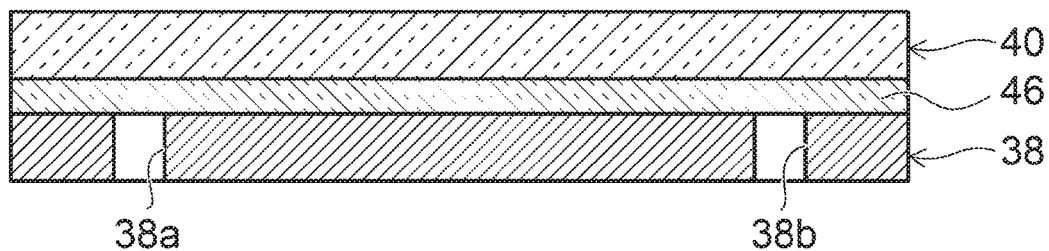
FIG. 5A to FIG. 5C are cross-sectional views illustrating a modification of the conductive member and the elastic body according to the first embodiment.
Figure 5B:
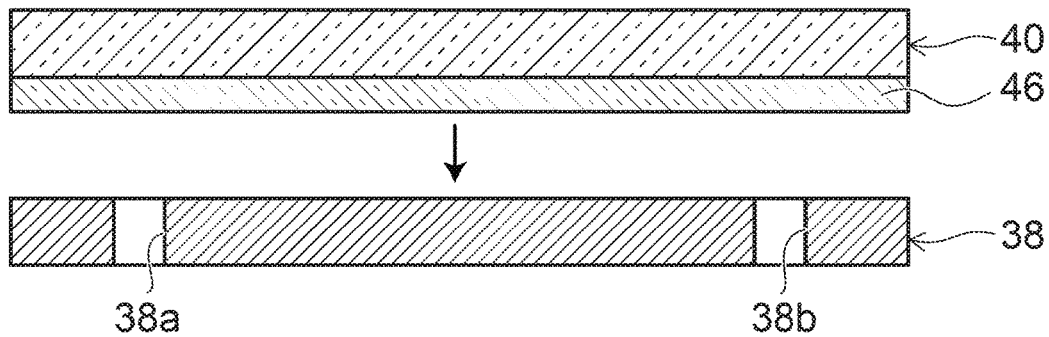
Figure 5C:
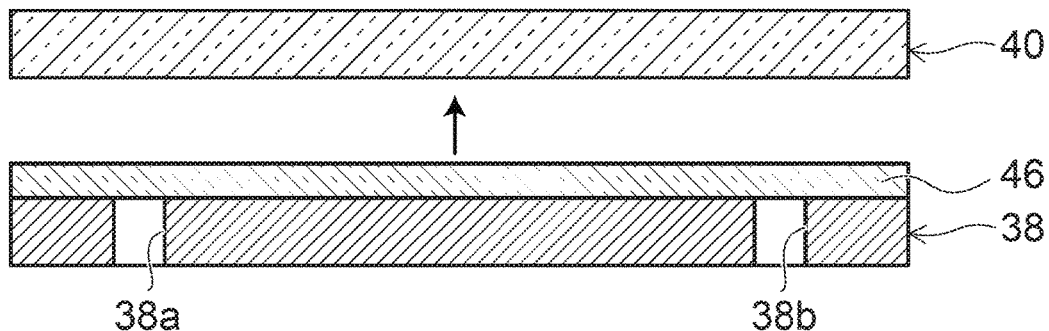

FIG. 5A to FIG. 5C are cross-sectional views illustrating a modification of the conductive member and the elastic body according to the first embodiment.

In the example as illustrated in FIG. 5A, an adhesive layer 46 is provided between the conductive member 40 and the elastic body 38. The adhesive layer 46 is conductive as well as adhesive. The adhesive layer 46 also is light-transmissive to the detection light and the reflected light. The conductive member 40 and the elastic body 38 are adhered to each other via the adhesive layer 46 and are electrically connected to each other via the adhesive layer 46.

Thus, by providing the adhesive layer 46, for example, the ease of assembly of the conductive member 40 and the elastic body 38 can be improved. The conductive member 40 and the elastic body 38 can contact each other with higher certainty. The conductive member 40 and the elastic body 38 can be electrically connected with higher certainty.

The adhesive layer 46 may be provided in the conductive member 40 as illustrated in FIG. 5B, or may be provided in the elastic body 38 as illustrated in FIG. 5C. It is sufficient for the adhesive layer 46 to be provided in at least one of the conductive member 40 or the elastic body 38.

FIG. 6A to FIG. 6D are cross-sectional views illustrating a modification of the conductive member according to the first embodiment.

Figure 6A:
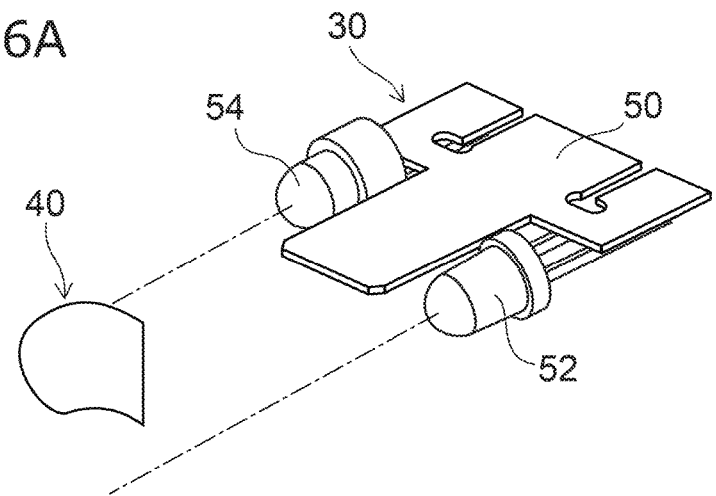
FIG. 6A to FIG. 6D are cross-sectional views illustrating a modification of the conductive member according to the first embodiment.

In the example as illustrated in FIG. 6A, the conductive member 40 covers only the front of the light receiving element 54. Thus, the conductive member 40 may not always cover the front of the light-projecting element 52. In such a case, the attenuation of the detection light when passing through the conductive member 40 is suppressed; and more intense detection light can be projected to the outside. Although the ideal transmittance of the conductive member 40 is 100%, it is difficult to obtain substantially 100%; and the light emission intensity is reduced by the detection light passing through the conductive member 40. However, there are also cases where the location where the shielding performance is strongly needed is the light receiving element 54 and light receiving circuit periphery, and the shielding performance as the photoelectric sensor is sufficient even without shielding the periphery of the light-projecting element 52. In such a case, the necessity to shield the front of the light-projecting element 52 using the conductive member 40 is low; and it is sufficient to shield only the front of the light receiving element 54. That is, more intense detection light can be projected to the outside while maintaining the shielding resilience as the photoelectric sensor 18.

Figure 6B:
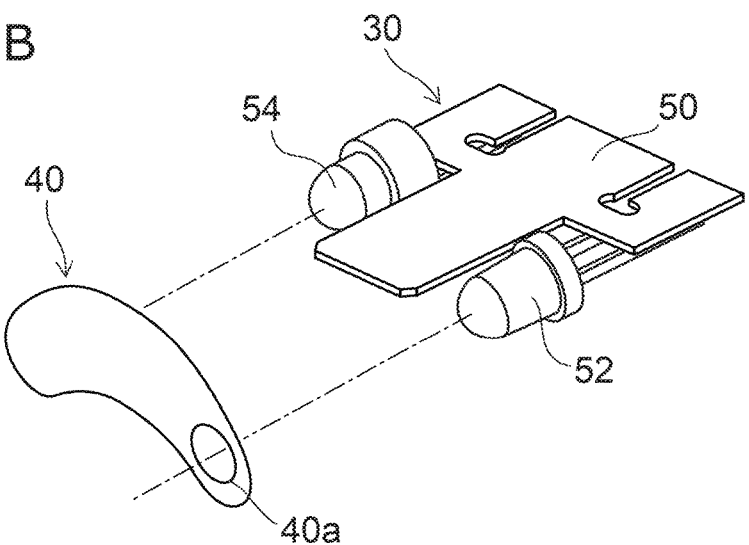

In the example as illustrated in FIG. 6B, the conductive member 40 covers the front of the sensor main body 30 and has an opening 40a exposing the light-projecting element 52. Thus, the light-projecting element 52 may be exposed by the opening 40a while the front of the sensor main body 30 is covered. Even in such a case, similarly to the case of FIG. 6A, the attenuation of the detection light when passing through the conductive member 40 is suppressed; and more intense detection light can be projected to the outside.

In the example, for example, it is sufficient for the conductive member 40 to be disposed to match the front surface 34a of the interior case 34; and compared to the case of FIG. 6A, the ease of assembly of the conductive member 40 can be improved. The undesirable looseness of the polarizing plate 42 due to a gap opening between the elastic body 38 and the polarizing plate 42 at the portion at the front of the light-projecting element 52, etc., can be suppressed.

The opening 40a that has a through-hole configuration is illustrated in FIG. 6B. For example, the configuration of the opening 40a may be a notch configuration.

Figure 6C:
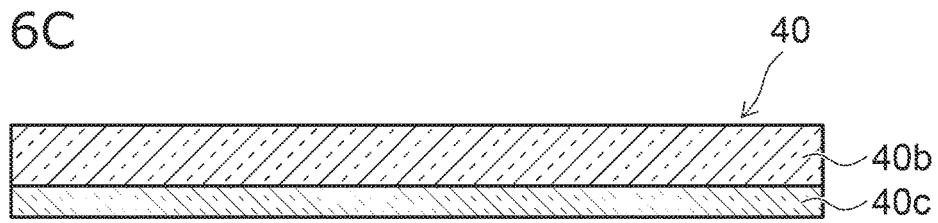

In the example as illustrated in FIG. 6C, the conductive member 40 includes a light-transmissive substrate part 40b, and a light-transmissive conductive film 40c provided at one surface of the substrate part 40b. The substrate part 40b includes, for example, a transparent resin material. The substrate part 40b is insulative. The conductive film 40c includes, for example, an ITO film. Thus, the conductive member 40 may be conductive on only one surface. In such a case, for example, the manufacturing cost of the conductive member 40 can be reduced.

In the case where only one surface of the conductive member 40 is conductive, for example, as illustrated in FIG. 6A and FIG. 6B, the configuration of the conductive member 40 when viewed from the front is different between when the conductive film 40c faces the light receiving element 54 side and when the conductive film 40c faces the side opposite to the light receiving element 54.

Thereby, even in the case where the conductive film 40c is provided on only the one surface of the substrate part 40b, the orientation of the mounting of the conductive member 40 is determined uniquely; and the ease of assembly can be improved further. The undesirable mounting of the conductive member 40 in the reverse orientation can be suppressed.

Figure 6D:
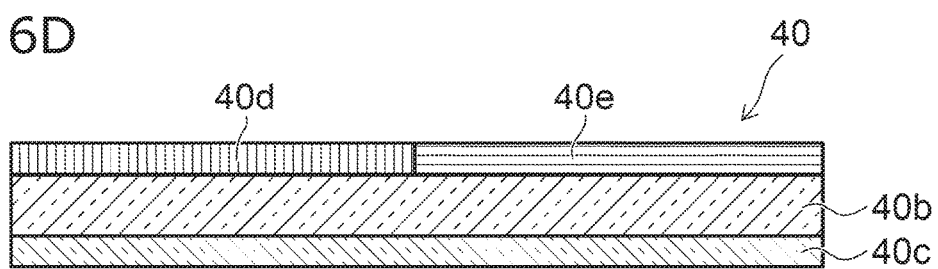

In the example as illustrated in FIG. 6D, the conductive member 40 further includes a first polarizing film 40d and a second polarizing film 40e. The first polarizing film 40d and the second polarizing film 40e are provided at another surface of the substrate part 40b. The first polarizing film 40d covers the front of the light-projecting element 52. The second polarizing film 40e covers the front of the light receiving element 54. The function of the first polarizing film 40d is substantially the same as the function of the first region 42a of the polarizing plate 42. The function of the second polarizing film 40e is substantially the same as the function of the second region 42b of the polarizing plate 42. In other words, in the example, the polarizing plate 42 is formed as one body with the conductive member 40. In other words, in the example, the conductive member 40 has the function of the polarizing plate 42.

Thus, the polarizing plate 42 may be formed as one body with the conductive member 40. Thereby, the number of parts of the photoelectric sensor 18 is reduced; and the ease of assembly can be improved.

Figure 7A:
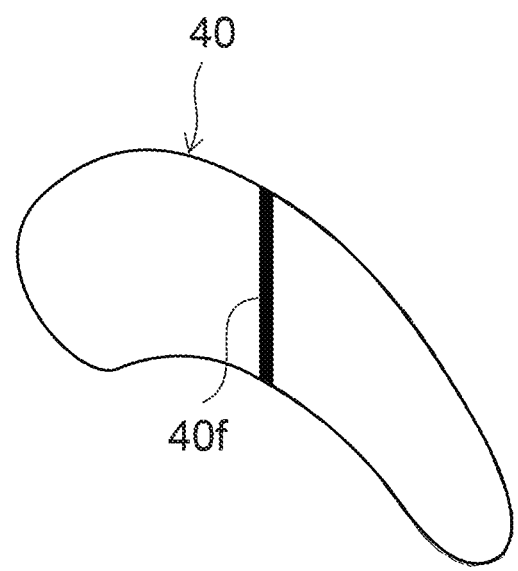
FIG. 7A and FIG. 7B are a perspective view and a descriptive view illustrating a modification of the conductive member according to the first embodiment.
Figure 7B:
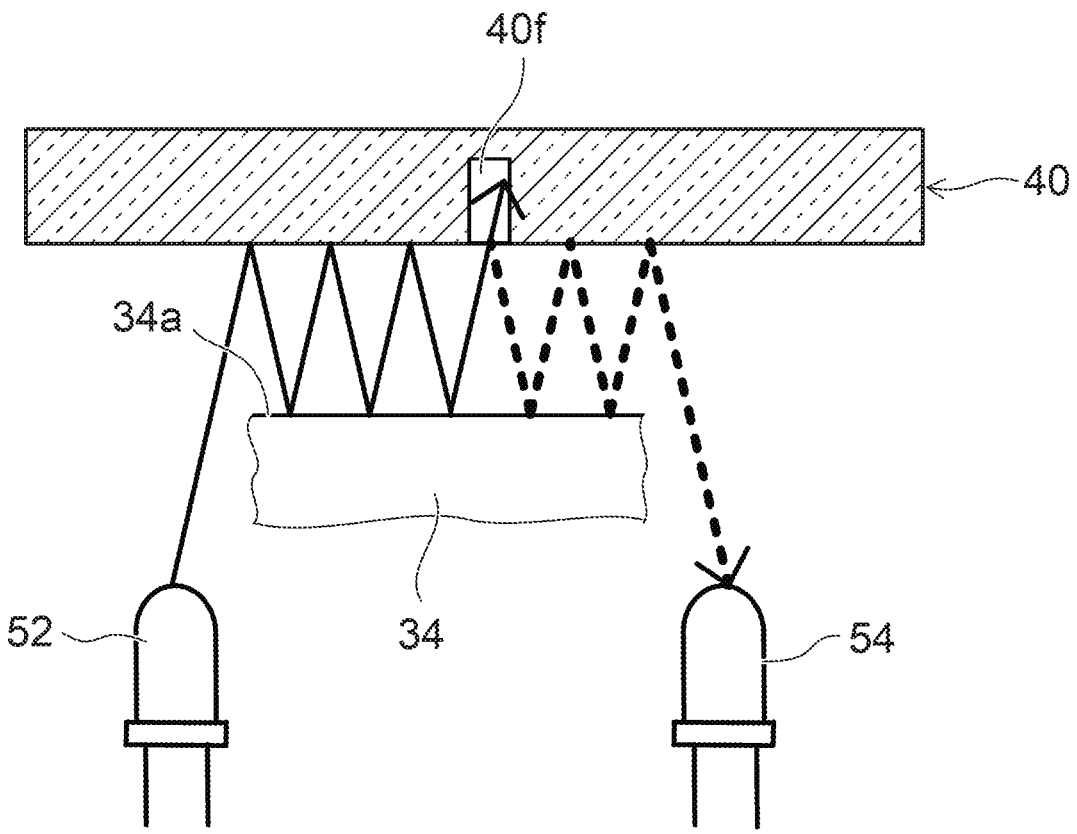

FIG. 7A and FIG. 7B are a perspective view and a descriptive view illustrating a modification of the conductive member according to the first embodiment.

In the example as illustrated in FIG. 7A and FIG. 7B, the conductive member 40 covers the front of the sensor main body 30 and has a trench part 40f provided at a position opposing the portion between the light-projecting element 52 and the light receiving element 54. In FIG. 7B, the interior case 34 is illustrated as being simplified for convenience.

For example, the trench part 40f is provided in the surface opposing the light-projecting element 52 and the light receiving element 54. For example, the trench part 40f extends in a direction orthogonal to the direction in which the light-projecting element 52 and the light receiving element 54 are arranged.

Thus, by providing the trench part 40f, for example, the travel direction of the light diffusely reflected between the conductive member 40 and the interior case 34 can be changed by the trench part 40f. Thereby, as illustrated in FIG. 7B, the incidence on the light receiving element 54 of the light diffusely reflected by the conductive member 40 can be suppressed. A portion of the light projected from the light-projecting element 52 that is diffusely reflected and is directly incident on the light receiving element 54 can be suppressed.

Figure 8A:
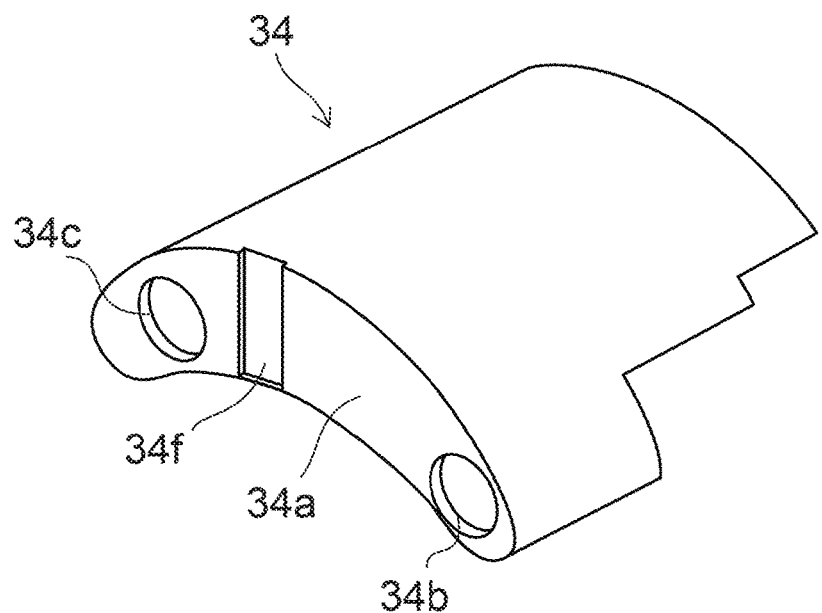
FIG. 8A and FIG. 8B are a perspective view and a descriptive view illustrating a modification of the interior case according to the first embodiment.
Figure 8B:
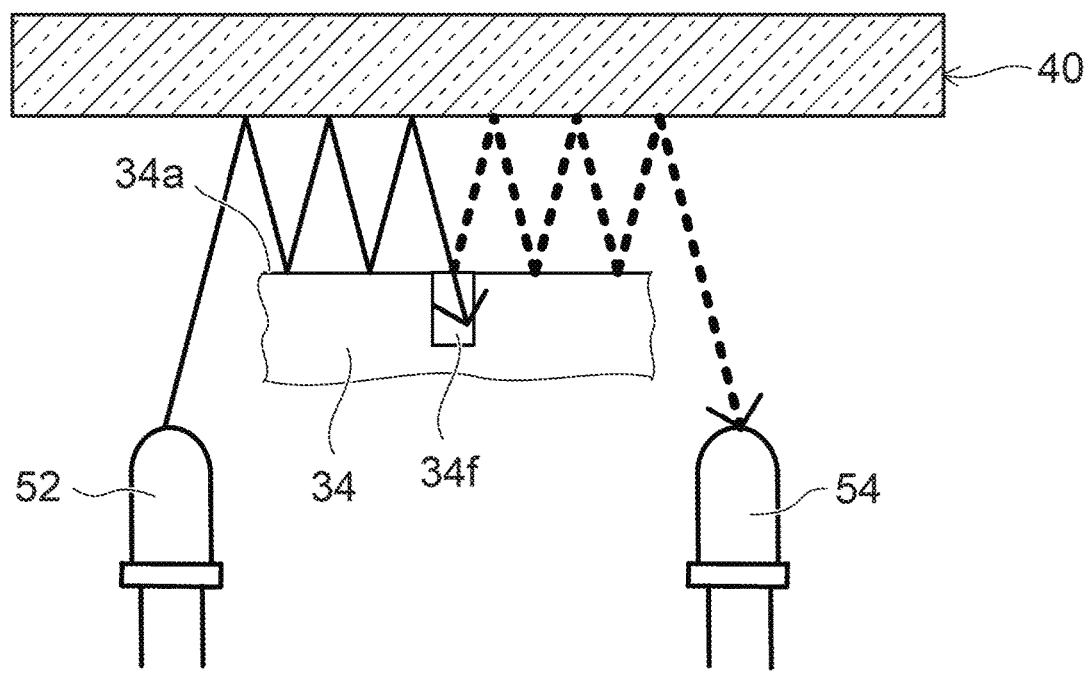

FIG. 8A and FIG. 8B are a perspective view and a descriptive view illustrating a modification of the interior case according to the first embodiment.

In the example as illustrated in FIG. 8A and FIG. 8B, the interior case 34 includes the front surface 34a extending between the light-projecting element 52 and the light receiving element 54, and a trench part 34f provided in the front surface 34a. For example, the trench part 34f extends in a direction orthogonal to the direction in which the light-projecting element 52 and the light receiving element 54 are arranged. In FIG. 8B, similarly to FIG. 7B, the interior case 34 is illustrated as being simplified.

Thus, by providing the trench part 34f as illustrated in FIG. 8B, the incidence on the light receiving element 54 of the light diffusely reflected by the conductive member 40 can be suppressed. A portion of the light projected from the light-projecting element 52 that is diffusely reflected and is directly incident on the light receiving element 54 can be suppressed.

As described in reference to FIG. 4, by disposing the recess 34e between the light-projecting element 52 and the light receiving element 54 in the case where the recess 34e housing the tongue part 36b of the shield member 36 is provided in the front surface 34a of the interior case 34, the recess 34e may have the function of housing the tongue part 36b and the function of suppressing the incidence of the diffusely reflected light on the light receiving element 54.

In such a case, the incidence on the light receiving element 54 of the light diffusely reflected by the conductive member 40 can be suppressed by the recess 34e while suppressing the increase of the size of the entire photoelectric sensor 18 due to the tongue part 36b protruding from the front surface 34a of the interior case 34.

Figure 9:
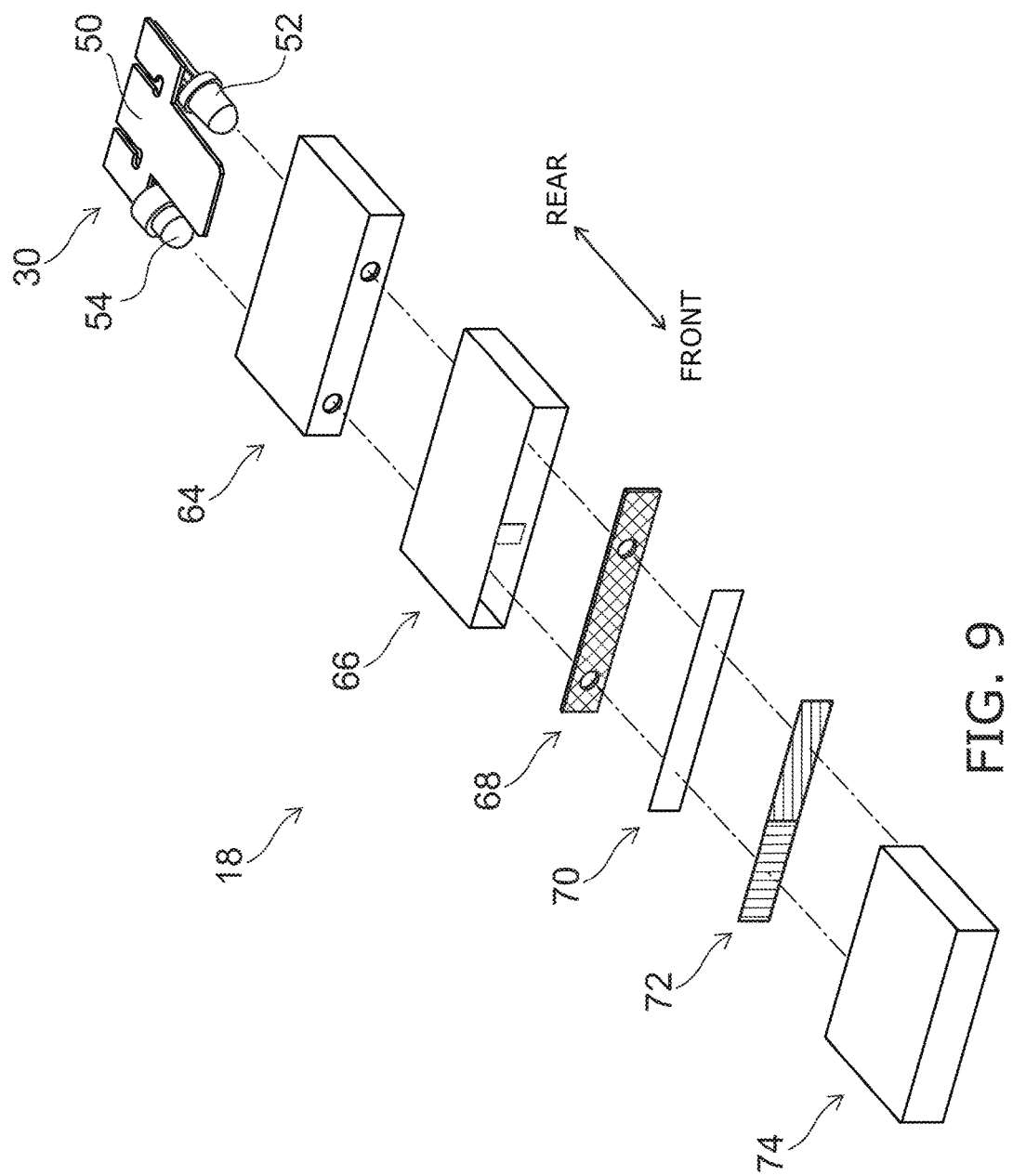
FIG. 9 is an exploded perspective view illustrating a modification of the photoelectric sensor according to the first embodiment.

FIG. 9 is an exploded perspective view illustrating a modification of the photoelectric sensor according to the first embodiment.

As illustrated in FIG. 9, the photoelectric sensor 18 includes the sensor main body 30, an interior case 64, a shield member 66, an elastic body 68, a conductive member 70, a polarizing plate 72, and a sensor case 74.

In the example, the interior case 64, the shield member 66, and the sensor case 74 have substantially rectangular parallelepiped configurations. The elastic body 68, the conductive member 70, and the polarizing plate 72 have substantially rectangular flat plate configurations. In the example, the photoelectric sensor 18 has a substantially rectangular parallelepiped configuration.

Other than the exterior configurations, the interior case 64, the shield member 66, the elastic body 68, the conductive member 70, the polarizing plate 72, and the sensor case 74 respectively are substantially the same as the interior case 34, the shield member 36, the elastic body 38, the conductive member 40, the polarizing plate 42, and the sensor case 44 of the embodiment recited above. Accordingly, a detailed description is omitted for the interior case 64, the shield member 66, the elastic body 68, the conductive member 70, the polarizing plate 72, and the sensor case 74.

Thus, the exterior configuration of the photoelectric sensor 18 may be a substantially rectangular parallelepiped configuration. The exterior configuration of the photoelectric sensor 18 may be any configuration.

Second Embodiment

Figure 10:
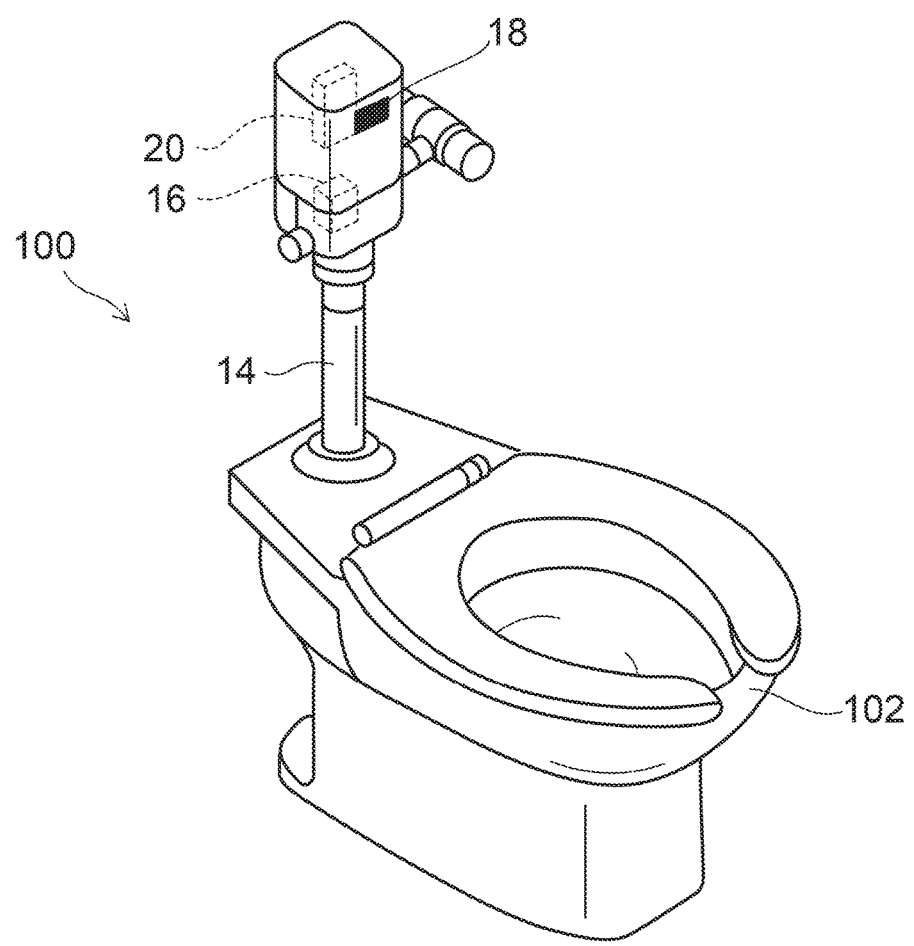
FIG. 10 is a perspective view illustrating a toilet apparatus according to a second embodiment.

FIG. 10 is a perspective view illustrating a toilet apparatus according to a second embodiment.

As illustrated in FIG. 10, the toilet apparatus 100 (the water discharge apparatus) includes a commode 102, the water supply path 14, the solenoid valve 16 (the opening/closing valve), the photoelectric sensor 18, and the controller 20. Components that are substantially the same functionally and configurationally as those of the faucet apparatus 10 described in reference to the first embodiment recited above are marked with the same reference numerals; and a detailed description is omitted.

The commode 102 includes a concave bowl, and a water discharge port (not illustrated) discharging washing water into the bowl. The commode 102 flushes solid waste, etc., excreted inside the bowl by discharging, from the water discharge port into the bowl, the washing water supplied via the water supply path 14. In other words, in the example, the commode 102 functions as the water discharger. In other words, the commode 102 is a western-style sit-down toilet.

Similarly to the first embodiment recited above, the photoelectric sensor 18 includes the sensor main body 30, the conductive member 40, etc. The photoelectric sensor 18 detects an object such as a hand of a user, etc., and inputs the detection result to the controller 20. For example, the controller 20 automatically washes the commode 102 by opening the solenoid valve 16 for a prescribed amount of time in response to the detection of the object by the photoelectric sensor 18. For example, the controller 20 may wash the commode 102 when the detection result of the photoelectric sensor 18 switches from the state in which the object is detected to the state in which the object is not detected. In other words, the controller 20 may wash the commode 102 in response to a movement of the user away from the commode 102.

In the toilet apparatus 100 thus configured, the conductive member 40 is provided at the front of the light receiving element 54 similarly to the first embodiment recited above. Thereby, similarly to the faucet apparatus 10 of the first embodiment recited above, the electromagnetic noise that enters from the front of the light receiving element 54 can be suppressed using a simple configuration in the toilet apparatus 100 as well.

Third Embodiment

Figure 11:
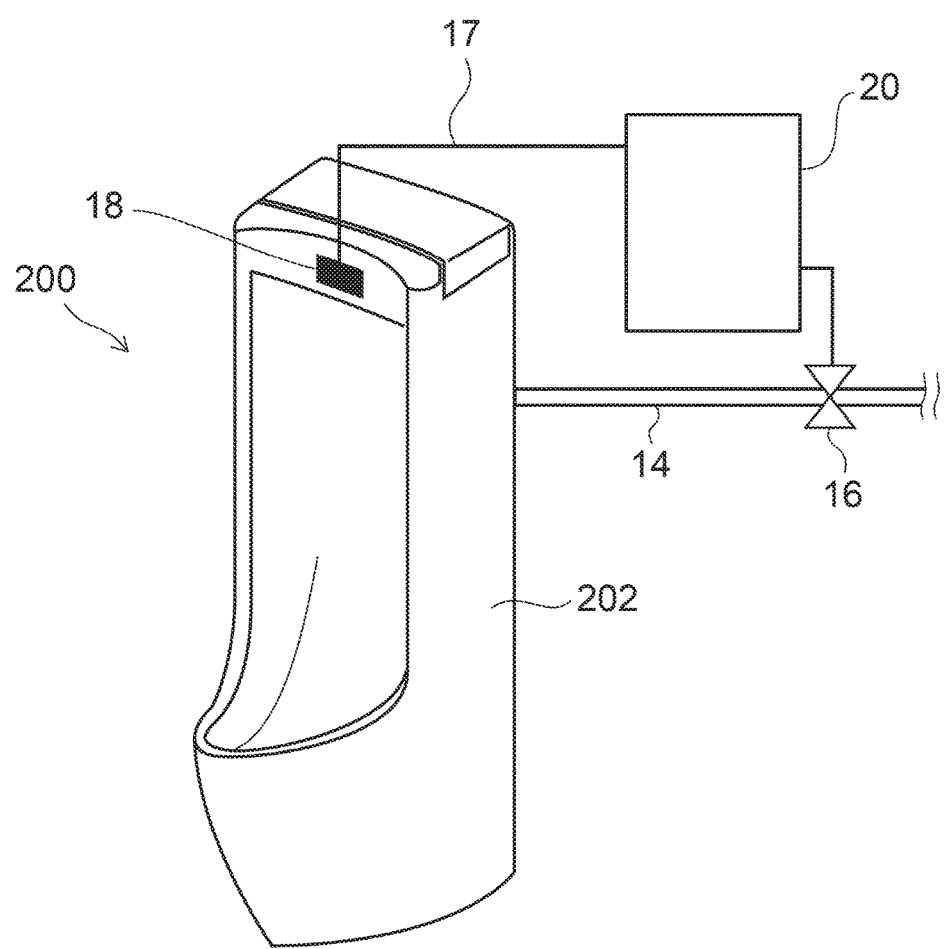
FIG. 11 is a descriptive view illustrating a toilet apparatus according to a third embodiment.

FIG. 11 is a descriptive view illustrating a toilet apparatus according to a third embodiment.

As illustrated in FIG. 11, the toilet apparatus 200 (the water discharge apparatus) includes a urinal 202, the water supply path 14, the solenoid valve 16 (the opening/closing valve), the photoelectric sensor 18, and the controller 20.

The urinal 202 includes a concave bowl, and a water discharge port (not illustrated) discharging washing water into the bowl. The urinal 202 washes the surface of the bowl by discharging, from the water discharge port into the bowl, the washing water supplied via the water supply path 14. In other words, in the example, the urinal 202 functions as the water discharger.

Similarly to the first embodiment recited above, the photoelectric sensor 18 includes the sensor main body 30, the conductive member 40, etc. The photoelectric sensor 18 detects an object such as a body of a user, etc., and inputs the detection result to the controller 20. For example, the controller 20 washes the urinal 202 when the detection result of the photoelectric sensor 18 switches from the state in which the object is detected to the state in which the object is not detected.

In the toilet apparatus 200 thus configured, the conductive member 40 is provided at the front of the light receiving element 54 similarly to the first embodiment recited above. Thereby, similarly to the faucet apparatus 10 of the first embodiment recited above, the electromagnetic noise that enters from the front of the light receiving element 54 can be suppressed using a simple configuration in the toilet apparatus 200 as well.

Thus, the water discharge apparatus may be a faucet apparatus, may be a toilet apparatus using a commode, or may be a toilet apparatus using a urinal. The water discharge apparatus is not limited thereto and may be any water discharge apparatus controlling the water discharge and shutoff by detecting the object.

The embodiments of the invention have been described above. However, the invention is not limited to the above description. Those skilled in the art can appropriately modify the design of the above embodiments. Such modifications are also encompassed within the scope of the invention as long as they include the features of the invention. For instance, the shape, dimension, material, and placement of each element of the faucet apparatus 10 and the toilet apparatus 100, 200 are not limited to those illustrated above, but can be appropriately modified.

Furthermore, the elements of the above embodiments can be combined with each other as long as technically feasible. Such combinations are also encompassed within the scope of the invention as long as they include the features of the invention.

What is claimed is:

1. A water discharge apparatus, comprising:
    a water discharger having a water discharge port discharging water;
    a water supply path guiding the water from a water supply source to the water discharge port;
    an opening/closing valve opening and closing the water supply path;
    a photoelectric sensor projecting detection light, receiving reflected light of the detection light, and outputting a received signal corresponding to a light reception amount of the reflected light; and
    a controller detecting an existence or absence of an object based on the received signal, and controlling opening and closing of the opening/closing valve according to a detection result of the object,
    the photoelectric sensor including
        a sensor main body including a light-projecting element and a light receiving element, the light-projecting element projecting the detection light toward a front, the light receiving element receiving the reflected light traveling from the front toward a rear, and
        a conductive member covering the front of the light receiving element, being formed in a sheet configuration, being light-transmissive to the detection light and the reflected light, being conductive, and being electrically connected to a reference potential of the sensor main body, the conductive member transmitting the reflected light and making the reflected light incident on the light receiving element.

2. The apparatus according to claim 1, wherein the photoelectric sensor further includes:
    an interior case holding the sensor main body; and
    a shield member surrounding the sensor main body and the interior case, the shield member being conductive, and
    the shield member includes a tongue part electrically connected to the conductive member.

3. The apparatus according to claim 2, wherein a recess housing the tongue part is provided in an outer surface of the interior case.

4. The apparatus according to claim 2, wherein
    the photoelectric sensor further includes a tubular body surrounding the light receiving element, the tubular body being conductive and being light-shielding to the detection light and the reflected light,
    the tubular body is electrically connected to the reference potential of the sensor main body and is held with the sensor main body by the interior case, and
    the shield member further surrounds the tubular body.

5. The apparatus according to claim 1, wherein
    the conductive member is electrically connected to the reference potential via an elastic body, the elastic body being elastic and conductive, and
    the elastic body is provided between the light-projecting element and the light receiving element.

6. The apparatus according to claim 5, wherein the elastic body surrounds the light receiving element in a state in which the light receiving element is viewed from the front.

7. The apparatus according to claim 5, wherein
    one of the conductive member or the elastic body includes an adhesive layer and is electrically connected via the adhesive layer, the adhesive layer being conductive.

8. The apparatus according to claim 1, wherein the conductive member covers only a front of the light receiving element.

9. The apparatus according to claim 1, wherein the conductive member covers a front of the sensor main body and has an opening exposing the light-projecting element.

10. The apparatus according to claim 1, wherein
    the conductive member includes a substrate part and a conductive film, the substrate part being light-transmissive, the conductive film being light-transmissive and being provided on one surface of the substrate part, and
    a configuration of the conductive member when viewed from the front is different between when the conductive film faces the light receiving element side and when the conductive film faces a side opposite to the light receiving element.

11. The apparatus according to claim 1, wherein the photoelectric sensor further includes a polarizing member provided at a front of the conductive member.

12. The apparatus according to claim 11, wherein the polarizing member is formed as one body with the conductive member.

13. The apparatus according to claim 1, wherein the conductive member covers a front of the sensor main body, and has a trench part provided at a position opposing a portion between the light-projecting element and the light receiving element.

14. The apparatus according to claim 2, wherein the interior case has a front surface and a trench part, the front surface extending between the light-projecting element and the light receiving element, the trench part being provided in the front surface.

15. The apparatus according to claim 3, wherein
    the interior case has a front surface extending between the light-projecting element and the light receiving element, and
    the recess is provided in the front surface.

* * * * *